United States Patent
Narahari

(10) Patent No.: US 11,176,369 B2
(45) Date of Patent: Nov. 16, 2021

(54) DIGITAL MONITORING OF ANALOG GAUGES WITH DYNAMICALLY CONFIGURABLE THRESHOLDS

(71) Applicant: Narasimha Kaushik Narahari, Bengaluru (IN)

(72) Inventor: Narasimha Kaushik Narahari, Bengaluru (IN)

(73) Assignee: RICOH COMPANY, LTD., Tokyo (JP)

( * ) Notice: Subject to any disclaimer, the term of this patent is extended or adjusted under 35 U.S.C. 154(b) by 133 days.

(21) Appl. No.: 16/726,189

(22) Filed: Dec. 23, 2019

(65) Prior Publication Data

US 2021/0192207 A1   Jun. 24, 2021

(51) Int. Cl.
*G06K 9/00* (2006.01)
*G06T 7/70* (2017.01)

(52) U.S. Cl.
CPC ............ *G06K 9/00624* (2013.01); *G06T 7/70* (2017.01); *G06K 2209/03* (2013.01)

(58) Field of Classification Search
CPC ... G06K 2209/03; G06K 9/00624; G06T 7/70
See application file for complete search history.

(56) References Cited

U.S. PATENT DOCUMENTS

| | | |
|---|---|---|
| 5,673,331 A | 9/1997 | Lewis et al. |
| 6,845,177 B2 | 1/2005 | Chiu |
| 8,319,665 B2 * | 11/2012 | Weinmann ............. G01C 23/00 340/937 |
| 8,594,365 B2 * | 11/2013 | Derkalousdian ......... G06K 9/00 382/100 |
| 9,135,492 B2 * | 9/2015 | Gellaboina .............. G06K 9/00 |
| 10,108,874 B2 | 10/2018 | Petruk |
| 10,168,192 B2 | 1/2019 | Chattopadhyay et al. |
| 2016/0086034 A1 * | 3/2016 | Kennedy ............. H04L 12/4625 382/200 |
| 2017/0089692 A1 * | 3/2017 | Chattopadhyay .. G06K 9/00771 |
| 2017/0169593 A1 * | 6/2017 | Leigh ........................ G06T 7/75 |

(Continued)

FOREIGN PATENT DOCUMENTS

| | | |
|---|---|---|
| CN | 104678963 | 7/2017 |
| CN | 108647686 | 10/2018 |

(Continued)

*Primary Examiner* — Ian L Lemieux
(74) *Attorney, Agent, or Firm* — Patent Law Works LLP

(57) ABSTRACT

A method for monitoring a gauge uses a machine learning model that was previously trained based on a set of training data to classify relative indicator positions between any pair of gauge images. The method receives an input indicative of a first reference gauge value and a first gauge image. The method classifies, using the machine learning model, the indicator position on the first gauge image relative to the indicator position on a first reference gauge image associated with the first reference gauge value and provides an output having a first value indicative of the indicator position of the first gauge image being on a first side of the indicator position of the first reference gauge image and a second value indicative of the indicator position of the first gauge image being on a second side of the indicator position of the first reference gauge image.

20 Claims, 12 Drawing Sheets

(56) References Cited

U.S. PATENT DOCUMENTS

| | | | |
|---|---|---|---|
| 2018/0012072 A1* | 1/2018 | Glaser | H04N 5/2252 |
| 2018/0014382 A1* | 1/2018 | Glaser | H04L 12/2814 |
| 2018/0096205 A1 | 4/2018 | Russell et al. | |
| 2019/0095739 A1* | 3/2019 | Gao | G01D 18/002 |
| 2021/0174086 A1* | 6/2021 | Cunningham | G06N 3/08 |
| 2021/0174131 A1* | 6/2021 | Schwartz | G06K 9/03 |

FOREIGN PATENT DOCUMENTS

| | | |
|---|---|---|
| CN | 109214378 | 1/2019 |
| CN | 109360396 | 2/2019 |
| CN | 109543688 | 3/2019 |
| WO | 2013/136295 | 9/2013 |
| WO | 2015/198132 | 12/2015 |
| WO | 2018/063545 | 4/2018 |

\* cited by examiner

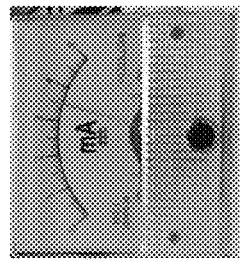
Image A
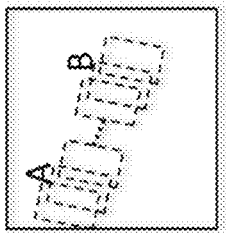
Composite Image Tensor AB
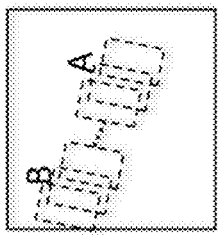
Image B
Composite Image Tensor BA
Figure 10

DIGITAL MONITORING OF ANALOG GAUGES WITH DYNAMICALLY CONFIGURABLE THRESHOLDS

FIELD OF THE INVENTION

The invention relates to visual monitoring of analog gauges and, in particular, to a method for monitoring analog gauges against dynamically configurable thresholds and deducing digital values of the gauges.

BACKGROUND OF THE INVENTION

Factories and industrial facilities employ machines that use analog gauges or meters for measuring or monitoring of parameters of the environment or of the operation state of the machines. These gauges or meters often have to be read manually by a human operator as the gauges either have no digital output or that have a digital output that is not supported by the user's hardware or software. Automation of gauge reading or gauge monitoring is sometimes desired. Systems and methods to digitally deduce the states of analog gauges through visual monitoring have been described. In many instances, there is an interest in automatic monitoring to determine if a reading of a gauge is above or below a threshold.

Prior solutions to digitize monitoring of analog gauges involve capturing digital images of a gauge and using machine learning or computer vision to read the images to determine the gauge reading. Prior solutions using computer vision based approaches require significant per-gauge customization (e.g. manually separating Indicator and Face) that are uneconomical for commercial use at scale. Furthermore, in some examples, prior solutions often train the machine learning algorithms to bin the gauge readings into sections, such as low, middle or high. Alternately, the machine learning algorithm may be trained to recognize gauge readings relative to a specific threshold. If the threshold value changes, the machine learning algorithms will need to be retrained to recognize readings relative to a new threshold. Retraining of the gauge monitoring machine learning algorithms is time consuming and may require machine downtime.

SUMMARY OF THE INVENTION

The present disclosure discloses an apparatus and method for a gauge monitoring computer vision system, substantially as shown in and/or described below, for example in connection with at least one of the figures, as set forth more completely in the claims.

In some embodiments, a method for monitoring a gauge having a face including markings denoting a scale for a parameter value being measured by the gauge and an indicator indicating a reading of the parameter value over the scale by displacement of the indicator on the face includes receiving an input indicative of a first reference gauge value; providing a first reference gauge image associated with the first reference gauge value to a machine learning model, wherein the machine learning model was previously trained based on a set of training data to classify relative indicator positions between any pair of gauge images; providing a first gauge image to the machine learning model; classifying, using the machine learning model, the indicator position on the first gauge image relative to the indicator position on the first reference gauge image; generating an output having a first value indicative of the indicator position of the first gauge image being on a first side of the indicator position of the first reference gauge image; and generating an output having a second value indicative of the indicator position of the first gauge image being on a second side of the indicator position of the first reference gauge image, the second side being opposite to the first side of the indicator position of the first reference gauge image.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

Various embodiments of the invention are disclosed in the following detailed description and the accompanying drawings.

FIGS. 2(a) and 2(b), illustrates a system environment in which the gauge monitoring comparator system of the present disclosure may be implemented.

FIG. 10 illustrates the tensor composer labeling operation in some embodiments.

DETAILED DESCRIPTION

According to embodiments of the present disclosure, a system and method for analog gauge monitoring uses a machine learning model that was previously trained based on a set of training data to classify relative indicator positions between any pair of gauge images. The gauge monitoring comparator system and method applies the machine learning model to determine a gauge's reading within a prescribed range or above or below a given reference value, where the range or the reference value is dynamically configurable without requiring re-training of the machine learning model. More specifically, the gauge monitoring comparator system and method applies a machine learning model that has been trained to discern relative positions of the gauge indicator by comparing images of the gauge with the indicator in different positions. The gauge monitoring comparator system and method applies the trained machine learning model to monitor an analog gauge relative to a reference value where the reference value can be dynamically configured. The gauge monitoring comparator system and method generates an output indicative of readings of the gauge relative to the reference value. In one embodiment, any one of the indicator position of the gauge can be selected as the reference value.

A salient feature of the gauge monitoring comparator system and method of the present disclosure is that the machine learning model is simply trained to discriminate indicator positions in two gauge images. As thus trained, the machine learning model is applied to determine if a reading of the current state of the gauge is less or greater than the reference value. In this manner, the machine learning model can be trained quickly and the trained machine learning model occupies less disk space, rendering it more cost effective in implementation.

Figure 1:
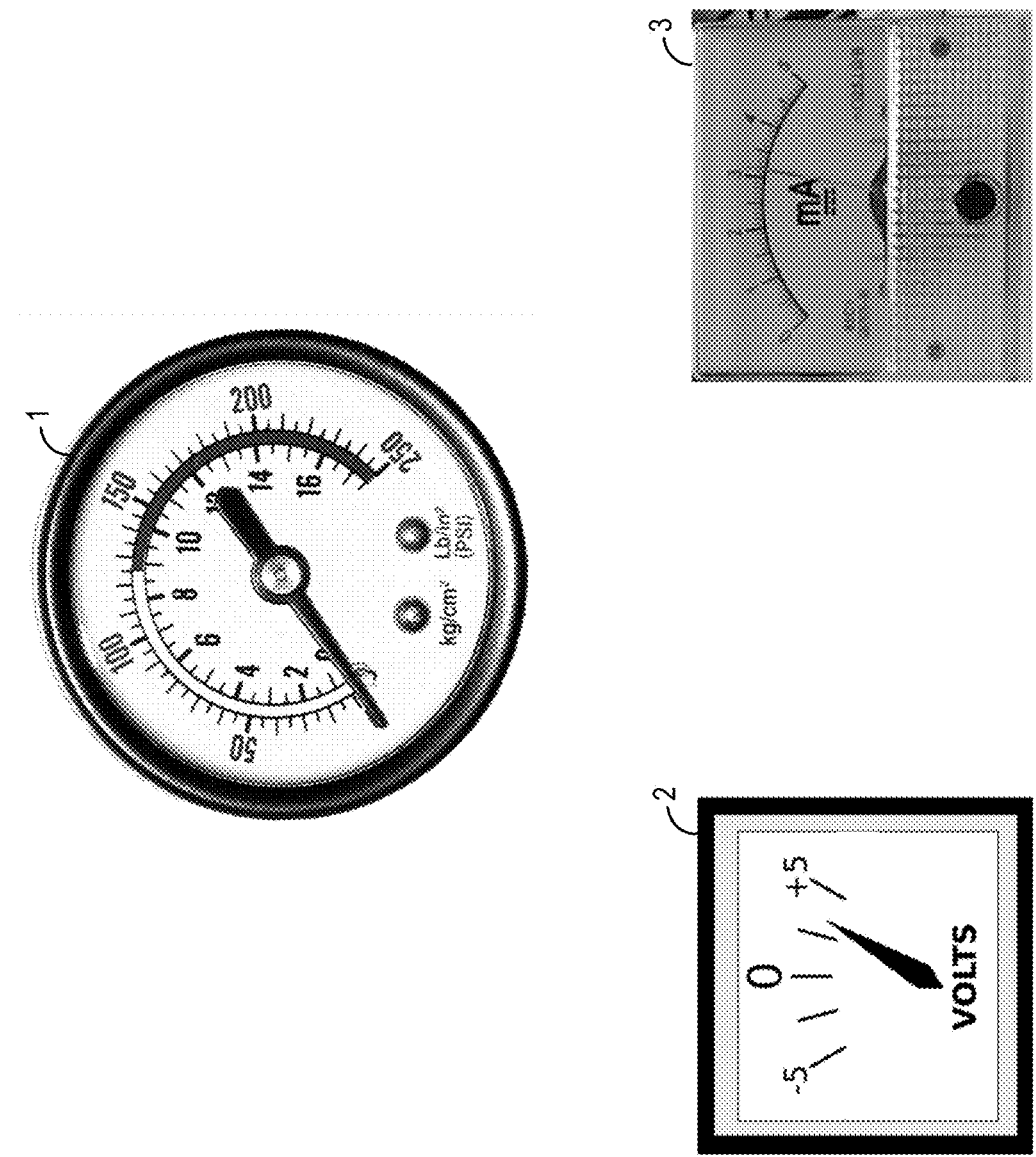
FIG. 1 illustrates example analog gauges to which digital monitoring may be desired.

In the present description, a gauge, also referred to as a meter, refers to a device that measures a parameter and indicates on a scale a quantity or condition associated with the parameter. FIG. 1 illustrates example analog gauges to which digital monitoring may be desired. Analog gauges are often used to measure physical parameters, such as temperature, pressure, voltage or current. Referring to FIG. 1, examples of pressure gauge 1, a voltmeter 2 and an ammeter 3 are shown. An analog gauge includes a face being the background of the gauge with markings thereon indicating a scale for a parameter to be measured by the gauge. The scale has a minimum value and a maximum value, forming a range of parameter values to be measured by the gauge. The analog gauge also includes an indicator, typically in the form of a needle, that is calibrated to move in response to changes in the given parameter. The scale indicates the range of possible indicator movement, from the minimum parameter value to the maximum parameter value.

The indicator moves relative to the scale on the face of the gauge. The indicator may move radially around a center point, as shown by the example gauges 1-3 in FIG. 1. In other examples, a gauge may include an indicator that moves along a straight line, such as a level indicator in a fluid level gauge. In the case the indicator moves radially, the scale is in the form of a circular arc and the reading values of the indicator is linear in nature with respect to the deflection angle of the indicator. In the case the indicator moves along a straight line, the scale is in the form of a line and the reading values of the indicator is linear in nature with respect to the displacement position of the indicator. The scale may be marked on the face of the gauge using various style of markings and the specific scale marking style or indicator needle type is not critical to the practice of the present disclosure. For a fluid level gauge where a fluid is visible in a transparent pipe, a gas flow gauge where a ball moves in a transparent pipe or a material level gauge where a material is visible through a transparent window in a container, the top of the material, ball or top of the fluid is the indicator, the transparent pipe or window is the face and the bottom and top of the transparent pipe or window are the markings of the minimum and maximum of the scale if there are no other explicit markings.

In some examples, the analog gauge is a pressure gauge used to measure air pressure or fluid pressure. For example, pressure gauge 1 provides a pressure reading value in kPa unit and in psi unit. The pressure gauge has a scale with a parameter range from 0 psi to 250 psi. The pressure gauge may further indicate a region of normal operation and a region of out-of-normal operation, as shown by pressure gauge 1 where a colored bar from 125 psi to 250 psi indicates out-of-normal operation. In other examples, the gauge may indicate a threshold vale, such as 125 psi. Other examples of analog gauges include the voltmeter 2 with a scale of −5V to +5V and an ammeter 3 with a scale of 0 to 5 mA.

In embodiments of the present disclosure, the gauge monitoring comparator system and method is applied to determine a gauge reading value relative to a reference value or a threshold and to generate an output signal, which can be an alert or an alarm signal, in the event the reading of the monitored gauge has exceeded the threshold. The reference value or the threshold can be dynamically established. That is, the gauge monitoring system and method enables the range or threshold being used in the gauge monitoring to be changed without requiring retraining of the machine learning model. In some embodiments, the gauge monitoring system and method is further applied to infer a digital gauge reading value.

Figure 2:
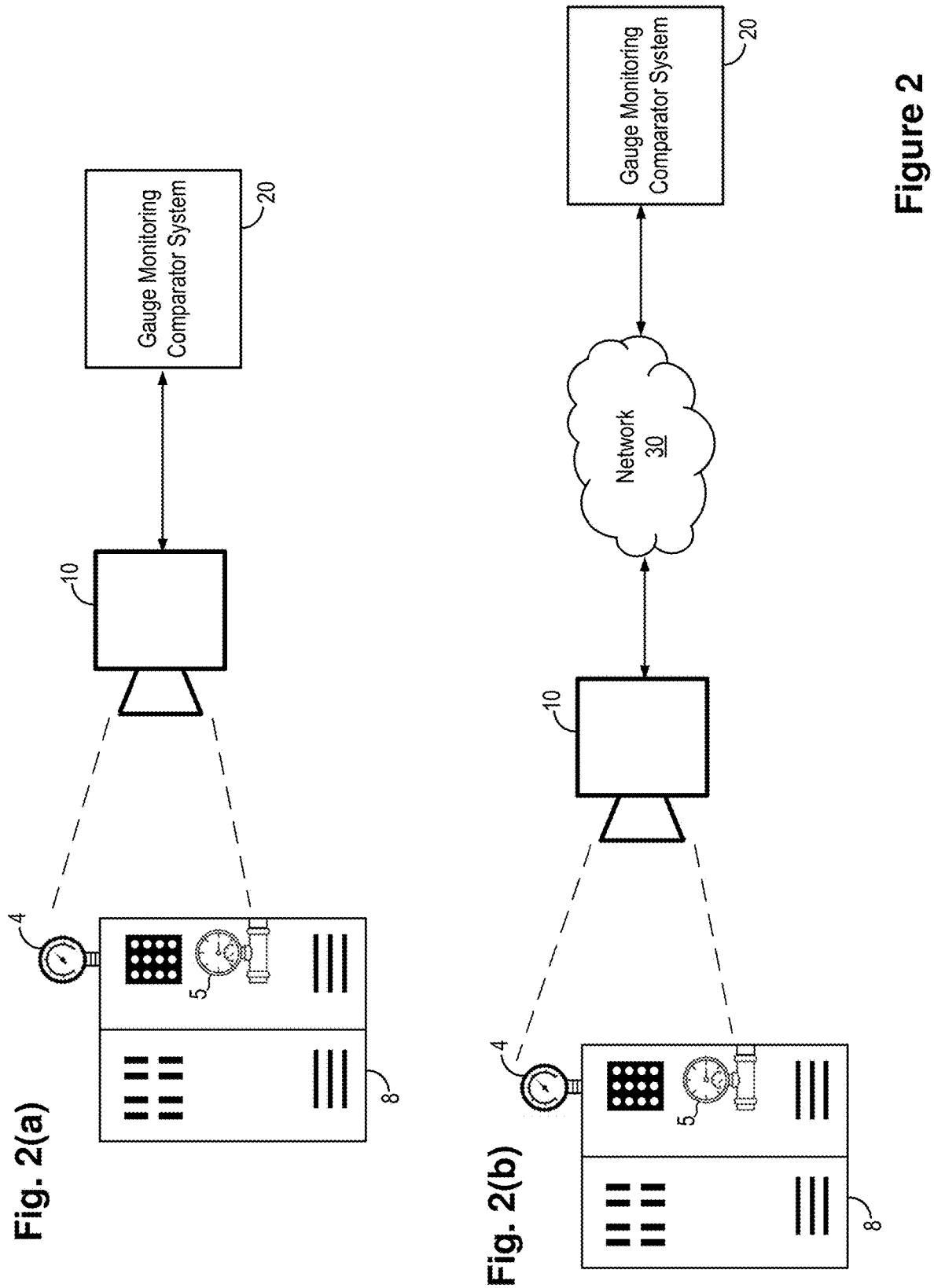
FIG. 2, which includes

FIG. 2, which includes FIGS. 2(a) and 2(b), illustrates a system environment in which the gauge monitoring comparator system of the present disclosure may be implemented. Referring to FIG. 2, a gauge monitoring comparator system 20 of the present disclosure is disposed to monitor one or more analog gauges 4, 5, such as analog gauge that are configured as part of an industrial machine 8. The gauge monitoring comparator system 20 receives images of the analog gauges 4, 5 as input. For example, one or more digital cameras 10 may be used to observe the gauges 4, 5. The gauge monitoring comparator system 20 is provided with a previously trained machine learning model to classify gauge images based on indicator positions. The system 20 receives images of the gauges 4, 5 in operation and provide output indicative of the current reading of the gauge being above or below a reference value. In some examples, the system 20 may provide an output value being a digital value of the gauge reading. In other examples, the system 20 may provide alarm notifications in response to the gauge reading being above or below the given reference value.

The gauge monitoring comparator system 20 can be implemented at the edge, such as on location with the gauges to be monitored, as shown in FIG. 2(a). Alternately, the gauge monitoring comparator system 20 can be implemented remotely from the gauges to be monitored, as shown in FIG. 2(b). The image capture device 10, or other computing device in communication with camera 10, can be configured to communicate with system 20 over a data network 30. Images captured by the image capture device 10 is transmitted to system 20 over the data network 30. In other embodiments, certain image processing functions may be performed at the image capture device 10 before the images are transmitted to system 20 over the data network 30. For example, the images captured by image capture device 10 may be scaled to a pre-defined size before being provided to system 20.

In the present disclosure, the image capture device 10 may be a digital camera providing a still image or video digital output including the gauge with resolution sufficient to capture the indicator on the gauge. In some examples, the camera 10 and the gauges 4,5 are fixed in position, e.g., affixed either to the machine or building containing the machine. Preferably, the relative position of the gauge 4 or 5 and the camera 10 is not required to be pixel accurate. In embodiments of the present disclosure, the camera 10 provides images in RGB format or as grayscale images. The camera 10 may also provide images in a color space that can be converted to RGB. In other embodiments, the camera 10 may provide depth information or multispectral information about the scene being observed.

In embodiments of the present disclosure, the gauge monitoring comparator system uses a machine learning model trained to discriminate the indicator position between two gauge images. As thus trained, the gauge monitoring comparator system provides two gauge images to the trained machine learning model—a first image of the current state of the gauge being monitored and a second image of the gauge at the reference or threshold value. The system provides an output indicating if the reading of gauge's current state is less than or greater than the gauge reading depicted in the reference image. The gauge monitoring comparator system of the present disclosure represents a marked improvement over existing solutions which involve training a machine learning system for a specific threshold/reference value. The existing solutions incur downtime in order to re-train the machine learning model each time the threshold is modified. To the contrary, the gauge monitoring comparator system and method of the present disclosure enables dynamic changes to the reference value. The system does not need to be taken down for training when a new reference is desired. In particular, the exact values of the current state and the reference state are not important. Rather, the gauge monitoring comparator system and method operates on the relative positions of the current state and the reference state. In this manner, the reference or threshold used by the system can be changed "on-the-fly" without needing to re-train the system to recognize any new reference values.

More specifically, the gauge monitoring comparator system and method of the present disclosure uses a machine learning model that is trained to generically discriminate indicator positions in pairs of gauge images as being to the left, or right of each other. Accordingly, the machine learning model is trained to know which indicator position is to the left or right of the other indicator position in a pair of gauge images and hence which indicator position indicates a higher reading value. As thus trained, a threshold or a reference value can be selected as being one of the gauge images against which another image is compared. The threshold can be changed by selecting another gauge image. The machine learning model does not need to be re-trained for a new threshold value as the machine learning model has learned to discriminate between the relative positions, as opposed to absolute positions.

Figure 3:
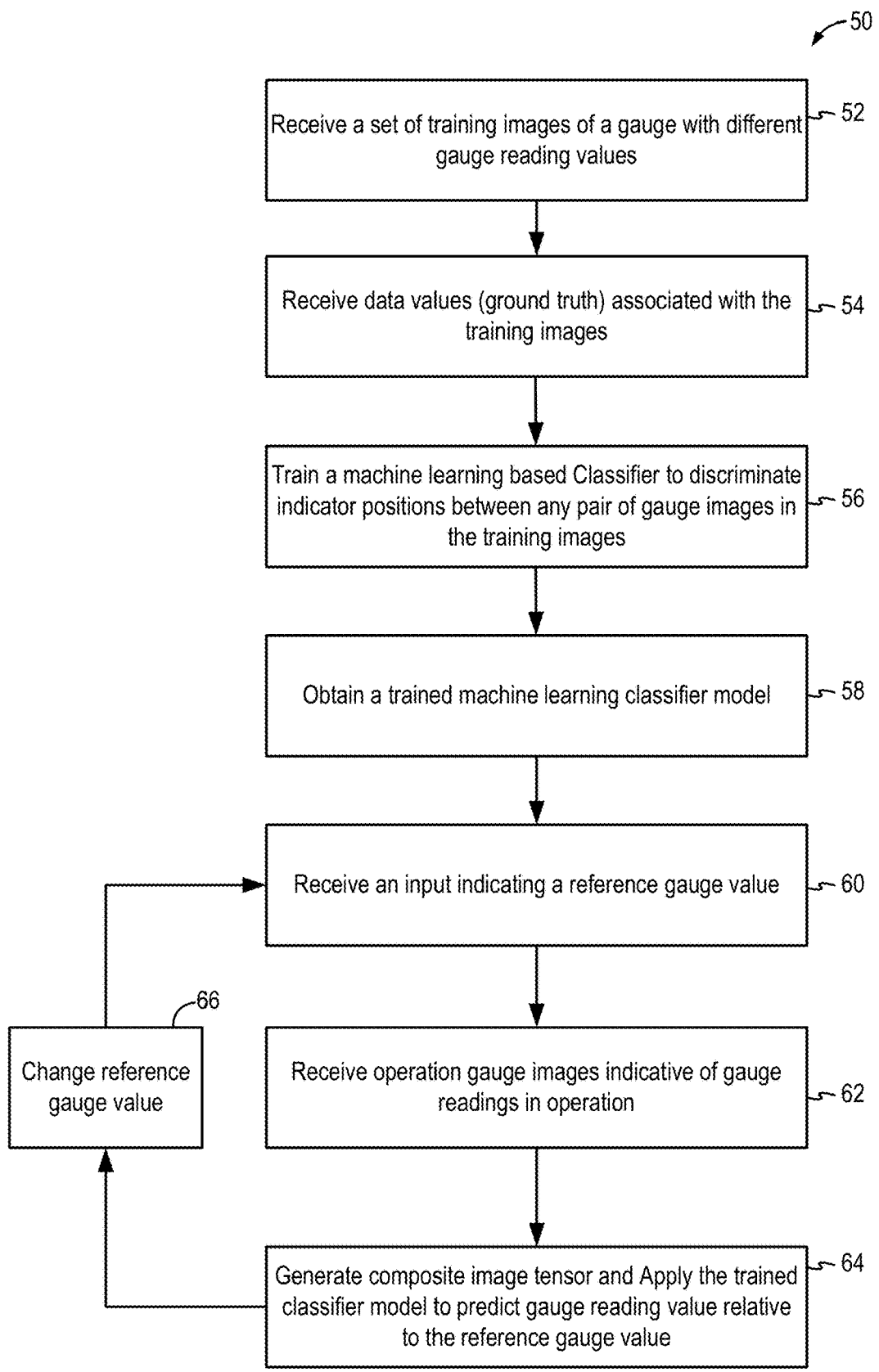
FIG. 3 is a flowchart illustrating a gauge monitoring comparator method in embodiments of the present disclosure.

FIG. 3 is a flowchart illustrating a gauge monitoring comparator method in embodiments of the present disclosure. The gauge monitoring comparator method can be implemented in the gauge monitoring comparator system of FIG. 2 in some embodiments. Referring to FIG. 3, a gauge monitoring method 50 receives a set of training images of a gauge to be monitored. The training images include gauge indicator at different gauge reading values (52). The method 50 further receives data values associated with the training images (54). The data values are sometimes referred to as the ground truth. The method 50 then trains a machine learning based classifier to discriminate the indicator positions between any pair of gauge images in the training images (56). As a result, the method 50 obtains a trained machine learning classifier model (58). The method 50 may then be deployed to monitor the current state of the gauge in normal operation. The method 50 receives an input indicating a reference gauge value (60). In some embodiments, the input is one of the training images having the reference gauge value. In other embodiments, the input is the reference gauge value and the method retrieves from the set of training images a reference gauge image associated with the reference gauge value. The method 50 further receives operation gauge images indicative of gauge readings in operation (62). The method 50 provides the reference gauge image and the operation gauge image to the trained machine learning based classifier model. The method 50 generates a composite image tensor of the operation gauge image and the reference gauge image and applies the trained classifier model to the composite image tensor to predict the reading value of the operation gauge image relative to the reference gauge value (64). In some embodiments, the trained machine learning model processes the pair of images in a feed-forward mode to generate an output indicative of the predicted reading value of the operation gauge image relative to the reference gauge value.

In one embodiment, the method 50 generates an output having a High state or a Low state to indicate whether the reading value of the operation gauge image is higher or lower than the reference gauge value based on the relative indicator positions. In one example embodiment, the method 50 generates an output having a Low state in response to determining the indicator in the operation gauge image is to the Left of the indicator in the reference gauge image. The method 50 further generates an output having a High state in response to determining the indicator in the operation gauge image is to the Right of the indicator in the reference gauge image.

The method 50 continues until the reference gauge value is to be changed (66). In that case, the method 50 receives another input indicating a modified or new reference gauge value (60). The method 50 then continues to operate to receive operation gauge images (62) and to apply the trained classifier model to predict the gauge reading value of the operation gauge images relative to the modified reference gauge value (64).

Figure 4:
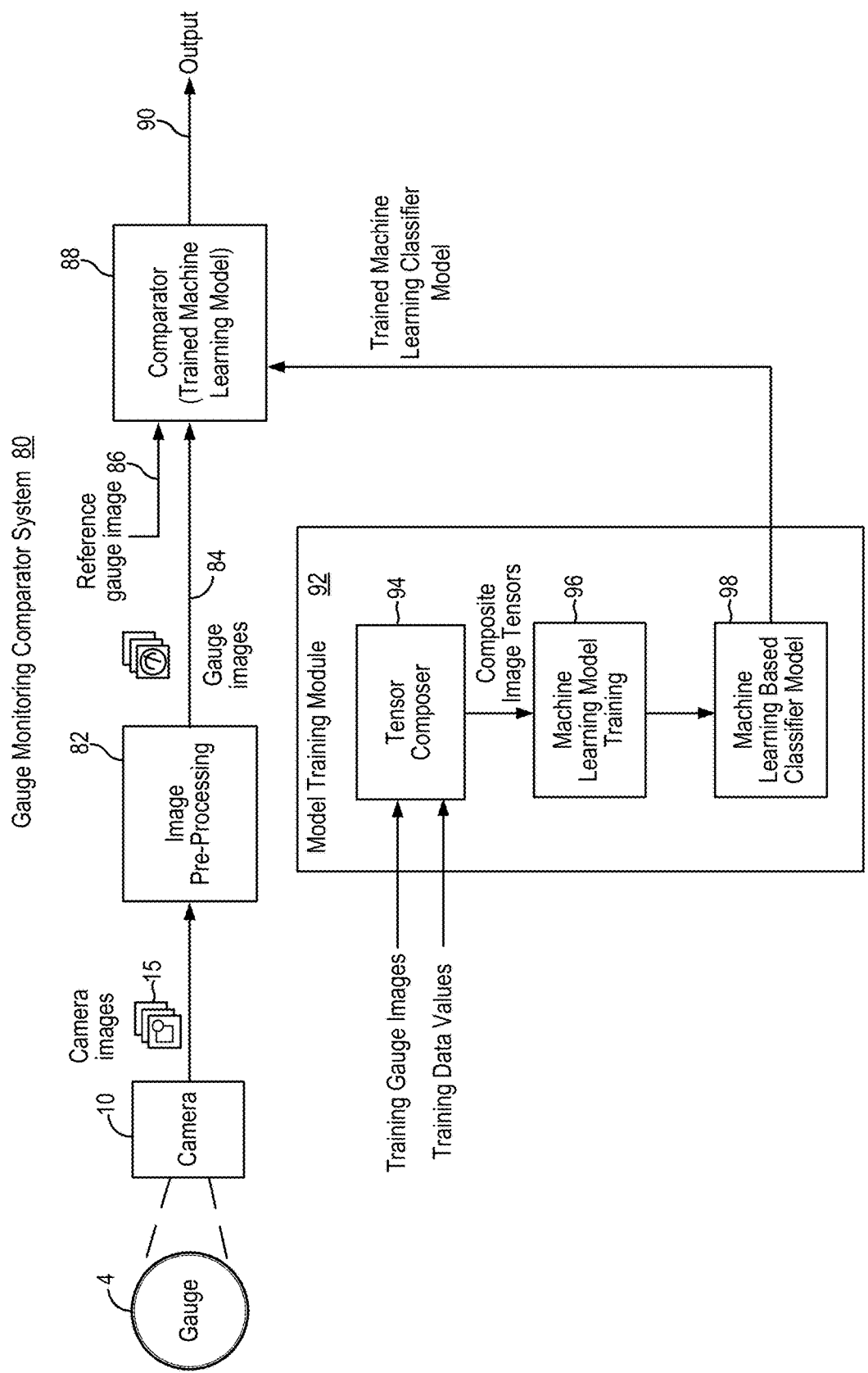
FIG. 4 is a block diagram illustrating a gauge monitoring comparator system in embodiments of the present disclosure.

FIG. 4 is a block diagram illustrating a gauge monitoring comparator system in embodiments of the present disclosure. Referring to FIG. 4, a gauge monitoring comparator system 80 includes an image pre-processing module 82, a comparator module 88 and a model training module 92. The system 80 is in communication with a camera 10 for receiving camera images 15 of a gauge 4 to be monitored. In some embodiments, the camera images 15 are provided to the image pre-processing module 82 to perform pre-processing of the camera images. In some embodiments, the camera image may be scaled to a desired image size. Other image processing functions such as color space conversion, contrast enhancement, edge enhancement and contour enhancement may be applied. Gauge images 84 are generated where each gauge image contains one or more gauges with or without surrounding background. The gauge images 84 and a reference gauge image 86 are provided to the comparator module 88. The comparator module 88 implements a trained machine learning model. In some embodiment, the comparator module 88 implements a trained machine learning based classifier model. The comparator module 88 generates an output 90 indicative of the relative indicator position between a gauge image 84 and the reference gauge image 86. It is instructive to note that in the present description, references to "gauge image(s)" refer to an image that contains at least one analog gauge with or without surrounding background. In some cases, the "gauge image" may contain multiple gauges. In some embodiments, the comparator module 88 is configured to recognize each gauge in the gauge image and process each gauge independently to generate an output for each gauge.

In embodiments of the present disclosure, the gauge monitoring comparator system 80 of the present disclosure includes a model training module 92 to train a machine learning model implemented as a comparator. The machine learning model is trained to generically discriminate indicator positions in pairs of images as being to the left, or right of each other. That is, the machine learning model learns to discriminate relative indicator positions between two images of indicator positions rather than the absolute position of the indicator on the face of the gauge. The machine learning model is not trained to precisely locate the absolute positions of indicators in the gauge images. With the relative positions learned, any of the indicator positions can then be used as the reference gauge value. In this manner, the system 80 can implement dynamically configurable threshold for gauge monitoring. The machine learning model of the present disclosure does not use absolute positions and therefore does not require a user to mark the location of the reference gauge value on the gauge image. The machine learning model of the present disclosure does not require the system 80 to be brought down for retraining each time the reference/threshold is changed.

Referring still to FIG. 4, the model training module 92 includes three components: a tensor composer module 94, a machine learning model training module 96, and a machine learning based classifier model 98. The model training module 92 receives a set of training gauge images. In some examples, the training gauge images are images of the gauge to be monitored with the gauge indicator at different positions over the scale of the gauge. In some embodiments, the training gauge images can be captured images of the gauge or synthetic images generated for the gauge with the indicator at various positions. The model training module 92 also receives the data values associated with the training gauge images. The data values are usually referred to as ground truth. In some embodiments, the data values indicate the gauge reading for each training gauge image.

At the model training module 92, the training gauge images are provided to the tensor composer module 94. The tensor composer module 94 takes a pair of the training gauge images from permutations of the training gauge images and generates a composite image tensor for each pair. In one embodiment, the tensor composer module 94 takes the pair of the training gauge images from all permutations of the training gauge images. The composite image tensors are provided to the training module 96 to train a machine learning model to discriminate the indicator positions between each pair of training images in each composite image tensor. As thus trained, a machine learning based classifier model 98 is generated. The machine learning based classifier model 98 is applied to evaluate any two gauge images and to generate an output value indicating the relative locations of the indicators in the two gauge images. For example, the machine learning based classifier model 98 can generate an output value of High in response to the indicator in the first image being to the right of the indicator in the second image and generate an output value of Low in response to the indicator in the first image being to the left of the indicator in the second image. The trained machine learning based classifier model 98 is then provided to the comparator module 88 to perform gauge monitoring on gauge images 84.

In the embodiments of the present disclosure, the comparator module 88 receives the gauge images 84 and the reference gauge image 86 and performs the same tensor composer function performed by tensor composer module 94 on a pair of images including a gauge image 84 and the reference gauge image 86. In particular, the comparator module 88 generates a composite image tensor of the gauge image 84 and the reference gauge image 86. The composite image tensor is then provided to the trained machine learning model to classify the pair of gauge images and to generate an output indicative of the relative indicator position between the gauge image 84 and the reference gauge image 86. The operation of the tensor composer module 94 will be described in more detail below.

In some embodiments, the comparator module 88 includes a discriminator module operating to map the machine learning model's classification into an output High or Low value. For each pair of input images including a gauge image and a reference gauge image, a composite image tensor is generated and the discriminator accepts the probabilities for the class High and for the class Low for the composite image tensor. The discriminator inspects which class has the higher probability value. The discriminator then outputs that class (high or low) as the relation between the two images in the composite image tensor. In this manner, the system 80 generates an output indicating whether the gauge image has a reading that is higher or lower than the reference gauge value.

Figure 5:
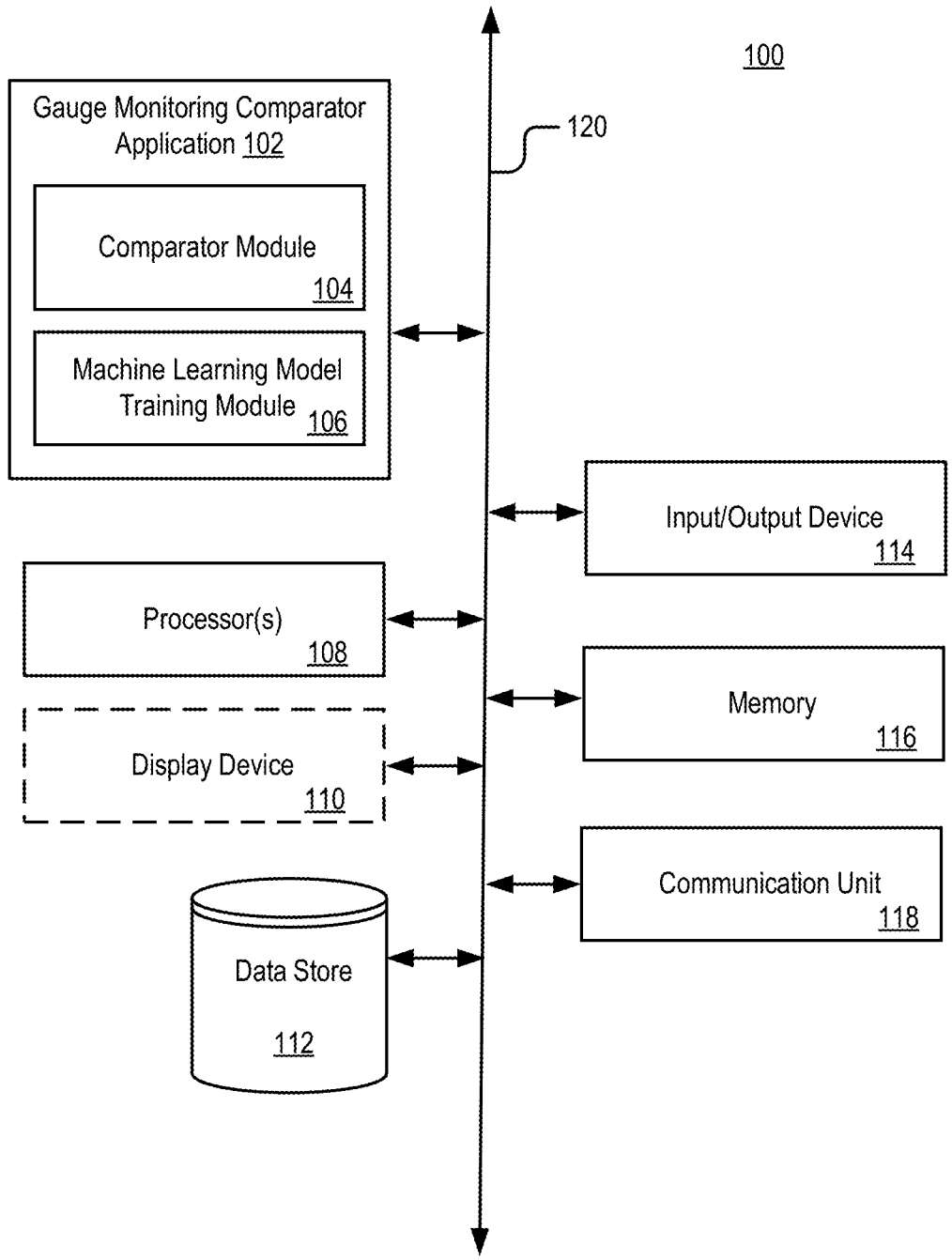
FIG. 5 is a block diagram of an example computing system which may represent the computer architecture of a computing device, computing entity, or server for implementing the gauge monitoring comparator system in embodiments of the present disclosure.

FIG. 5 is a block diagram of an example computing system which may represent the computer architecture of a computing device, computing entity, or server for implementing the gauge monitoring comparator system in embodiments of the present disclosure. Referring to FIG. 5, in some embodiments, the computing device 100 is implemented as a system which may also include one or more processors 108, a memory 116, an optional display device 110, a communication unit 118, a data storage 112, and an input/output device 114 according to some examples. The components of the system 100 are communicatively coupled to a bus 120 for communication with each other. The computing device further includes a gauge monitoring comparator application 102 for providing machine learning based gauge monitoring functions.

The processor 108 may execute software instructions by performing various input/output, logical, and/or mathematical operations. The processor 108 may have various computing architectures to process data signals. The processor 108 may be physical and/or virtual and may include a single processing unit or multiple processing units and/or cores. In some implementations, the processor 108 may be capable of generating and providing electronic display signals to a display device and other functions. In some implementations, the processor 108 may be coupled to the memory 116 via the bus 120 to access data and instructions therefrom and store data therein. The bus 120 may couple the processor 108 to the other components of the system including, for example, the memory 116, the communication unit 118, the gauge monitoring comparator application 102, and the data storage 243. It will be apparent to one skilled in the art that other processors, operating systems, and physical configurations are possible.

The memory 116 may store and provide access to data for the other components of the system. In some implementations, the memory 116 may store instructions and/or data that may be executed by the processor 108. The instructions and/or data may include code for performing the techniques described herein. For example, in one embodiment, the memory 116 may store the gauge monitoring comparator application 102. The memory 116 is also capable of storing other instructions and data, including, for example, an operating system, hardware drivers, other software applications, databases, etc. The memory 116 may be coupled to the bus 120 for communication with the processor 108 and the other components of the system.

The memory 116 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray, etc.) mediums, which can be any tangible apparatus or device that can contain, store, communicate, or transport instructions, data, computer programs, software, code, routines, etc., for processing by or in connection with the processor 108. In some implementations, the memory 116 may include one or more of volatile memory and non-volatile memory. It should be understood that the memory 116 may be a single device or may include multiple types of devices and configurations.

The display device 110 may be a liquid crystal display (LCD), light emitting diode (LED) or any other similarly equipped display device, screen or monitor. The display device 110 represents any device equipped to display user interfaces, electronic images and data as described herein. In different embodiments, the display is binary (only two different values for pixels), monochrome (multiple shades of one color), or allows multiple colors and shades. The display device 110 is coupled to the bus 120 for communication with the processor 108 and the other components of the system. It should be noted that the display device 110 is shown in FIG. 5 with dashed lines to indicate it is optional. For example, the system may be a server for performing computer vision for gauge monitoring without a display device 110.

The communication unit 118 is hardware for receiving and transmitting data by linking the processor 108 to a data network and other processing systems. In one embodiment, the communication unit 118 may include a port for direct physical connection to a data network. In another embodiment, the communication unit 118 may include a wireless transceiver (not shown) for exchanging data via a wireless network using one or more wireless communication methods, such as IEEE 802.11, IEEE 802.16, Bluetooth®, cellular communications, or another suitable wireless communication method.

The data storage 112 (or data store 112) is a non-transitory memory that stores data for providing the functionality described herein. In the illustrated embodiment, the data storage 112 is communicatively coupled to the bus 120 to receive data for storage and provide data for retrieval upon a request for the data. The data storage 112 may store gauge images, camera images and trained machine learning models for gauges being monitored.

In some embodiments, the gauge monitoring comparator application 102 includes a comparator module 104 and a machine learning model training module 106. The components of the gauge monitoring comparator application 102 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 108. In some embodiments, the components are instructions executable by the processor 108. In some implementations, the components are stored in the memory 116 and are accessible and executable by the processor 108.

Training the Machine Learning Model

Figure 6:
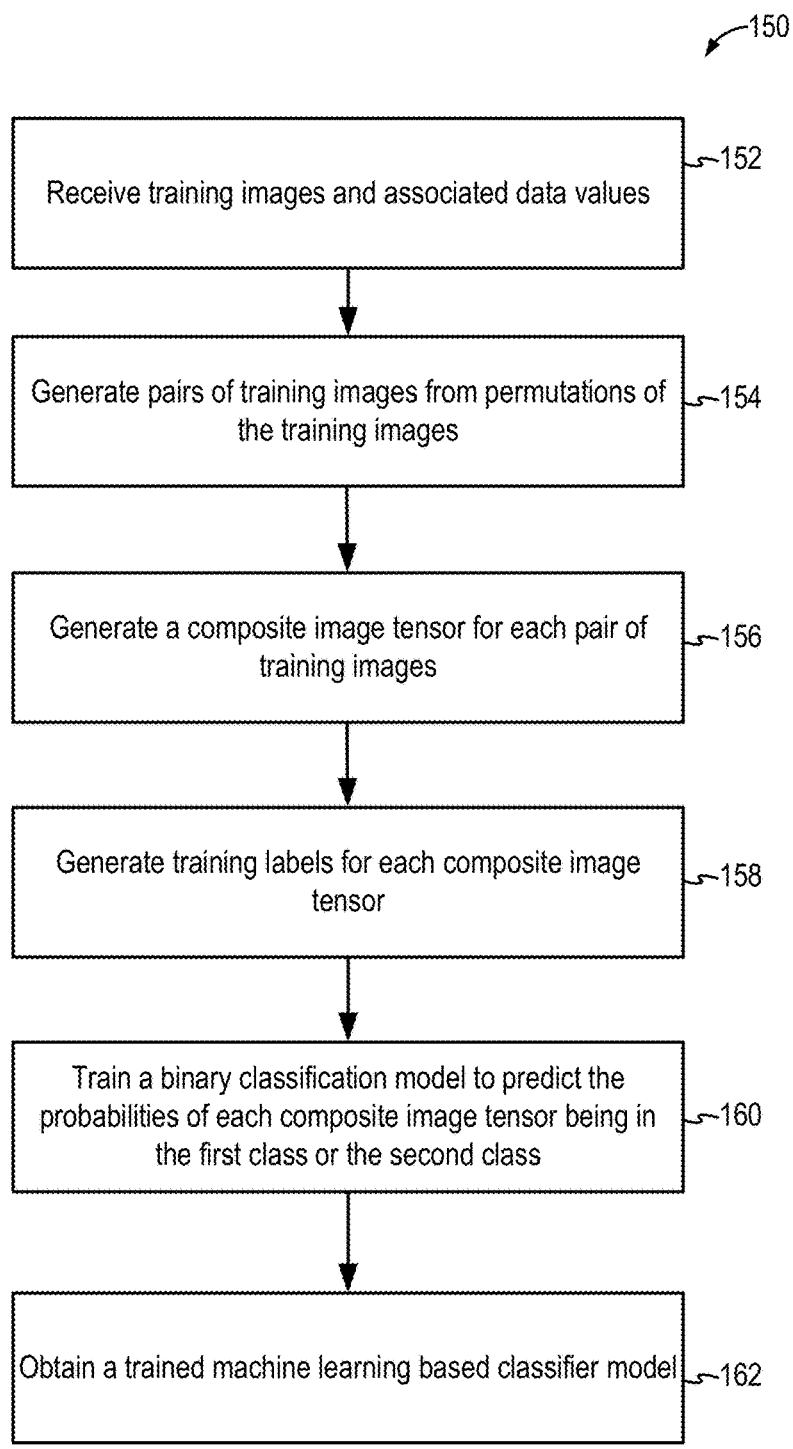
FIG. 6 is a flowchart illustrating the machine learning model training method in embodiments of the present disclosure.

The process to train the machine learning model to classify relative positions of gauge indicators of two images will now be described with reference to FIG. 6. FIG. 6 is a flowchart illustrating the machine learning model training method in embodiments of the present disclosure. Referring to FIG. 6, a training method 150 receives a set of training images and associated data values (152). The data values are sometimes referred to as the ground truth. In some embodiments, the set of training images represents most or all possible indicator positions of the gauge to be monitored. In one example, the analog gauge can be driven to all its possible gauge values in isolation and then the gauge images are captured at all of the possible gauge values. Each gauge image is mapped to a corresponding gauge value. That is, each gauge image is labelled with the corresponding gauge value. The set of training images and the associated data values are referred to as the training data set used for machine learning's model training. In other examples, the training images can be synthetic images that are generated using an image of the face of the gauge with the indicator being drawn or added to the face image at various or all indicator positions on the face of the gauge.

The method 150 generates pairs of training images from permutations of the training images (154). In some embodiments, the method 150 generates pairs of training images from all permutations of training images. In the present description, the pairs of training images are ordered pairs. That is, each pair of training image includes a first image and a second image in that order. An image A may be the first image and an image B may be the second image in one pair of training images. The same image B may be the first image and the same image A may be the second image in another pair of training images. Thus, the image pair AB and the image pair BA are considered different pairs of training images in the present description.

The method 150 then generates a composite image tensor for each pair of training images (156). The method 150 generates labels for each composite image tensor (158). In particular, the method 150 labels each pair's composite image tensor as belonging to a first class or to a second class based on the relative indicator position. In one embodiment, the method 150 labels a pair's composite image tensor as belonging to a first class when the indicator position of the first image is to the left of the indicator position of the second image. The method 150 labels a pair's composite image tensor as belonging to a second class when the indicator position of the first image is to the right of the indicator position of the second image. In one example, the first class can be labeled as Low while the second class can be labeled as High.

Using the composite image tensors and the associated labels, the method 150 trains a binary classification model to predict the probabilities of each composite image tensor being in the first class or the second class (160). The machine learning model is trained to learn to discriminate the indicator positions in two gauge images. In some embodiments, the machine learning model is implemented as a Convolutional Neural Network (CNN) or feature extraction and support vector machine (SVM). In operation, the machine learning model visualizes the image pair to discern the locations of the indicator in each gauge image. The machine learning model then learns the indicator position in the first image as being to the left or right, or above or below, the indicator position in the second image. As a result of the training, a trained machine learning based classifier model is obtained (162). The trained machine learning based classifier model is applied to classify any pair of gauge images as being in the first class (e.g. Low) or in the second class (e.g. High).

Generate Composite Image Tensors

Figure 7:
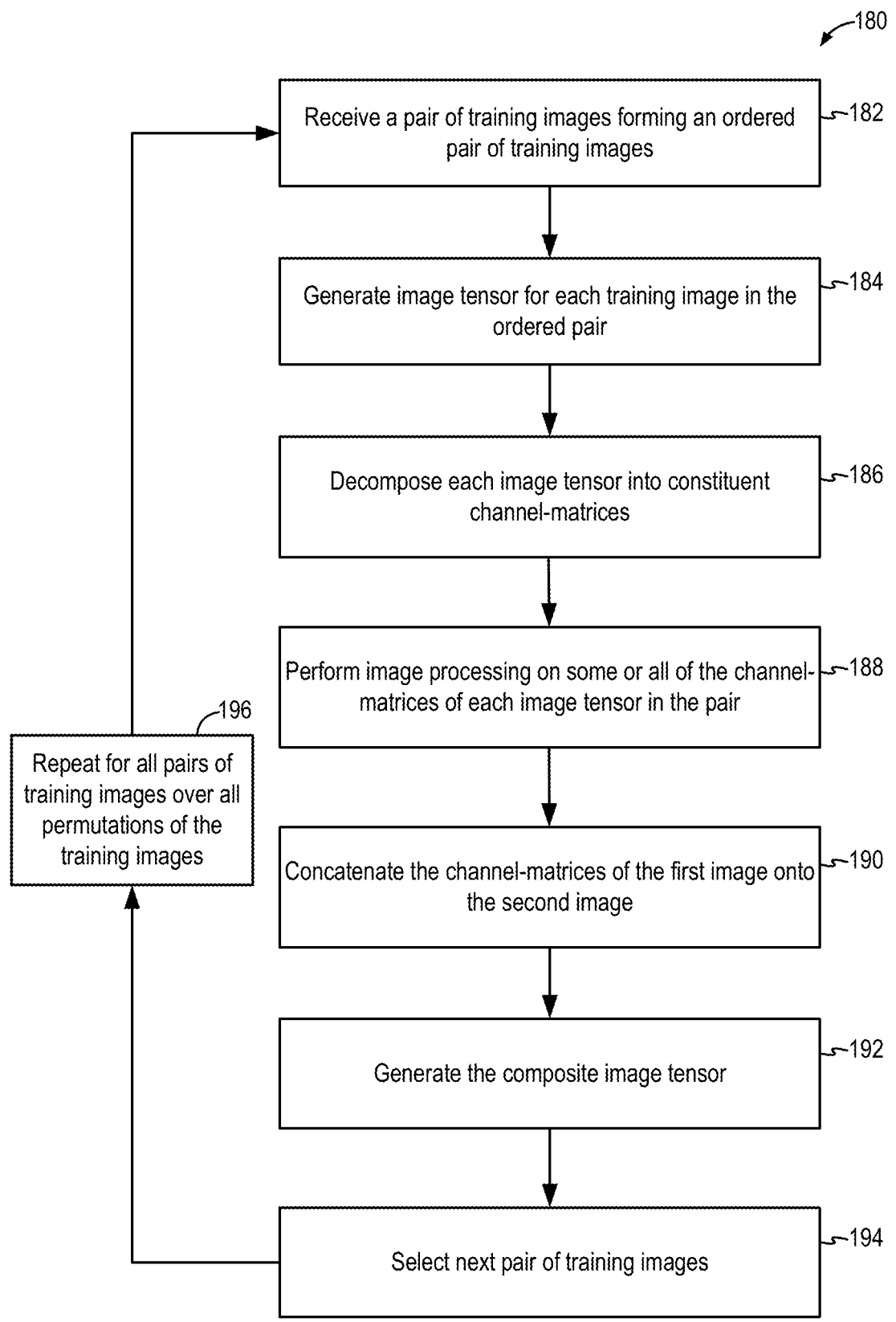
FIG. 7 is a flowchart illustrating the process for generating composite image tensors from the set of training gauge images in embodiments of the present disclosure.
Figure 8:
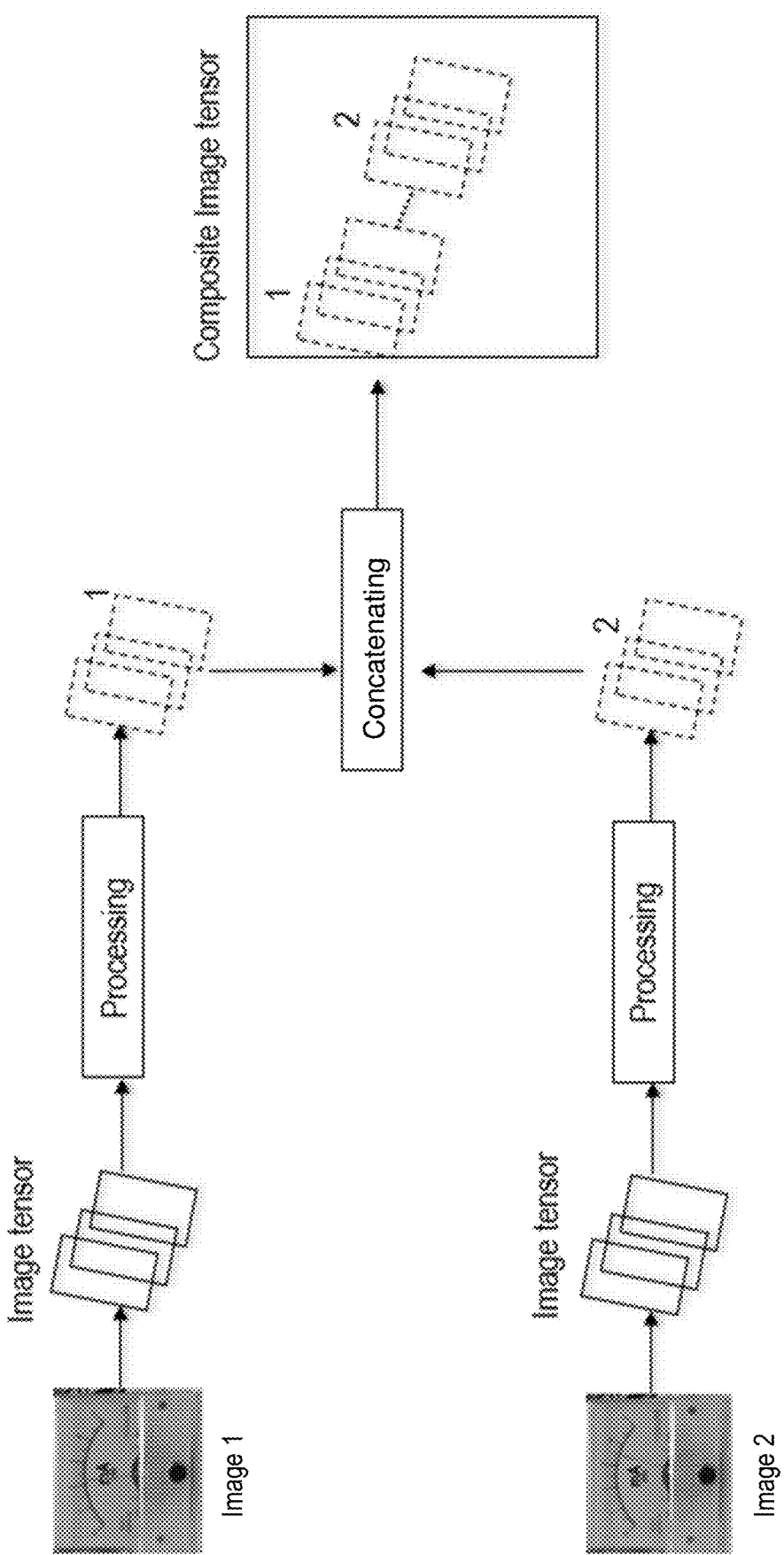
FIG. 8 illustrates the process of generating a composite image tensor from a pair of input images in embodiments of the present disclosure.
Figure 9:
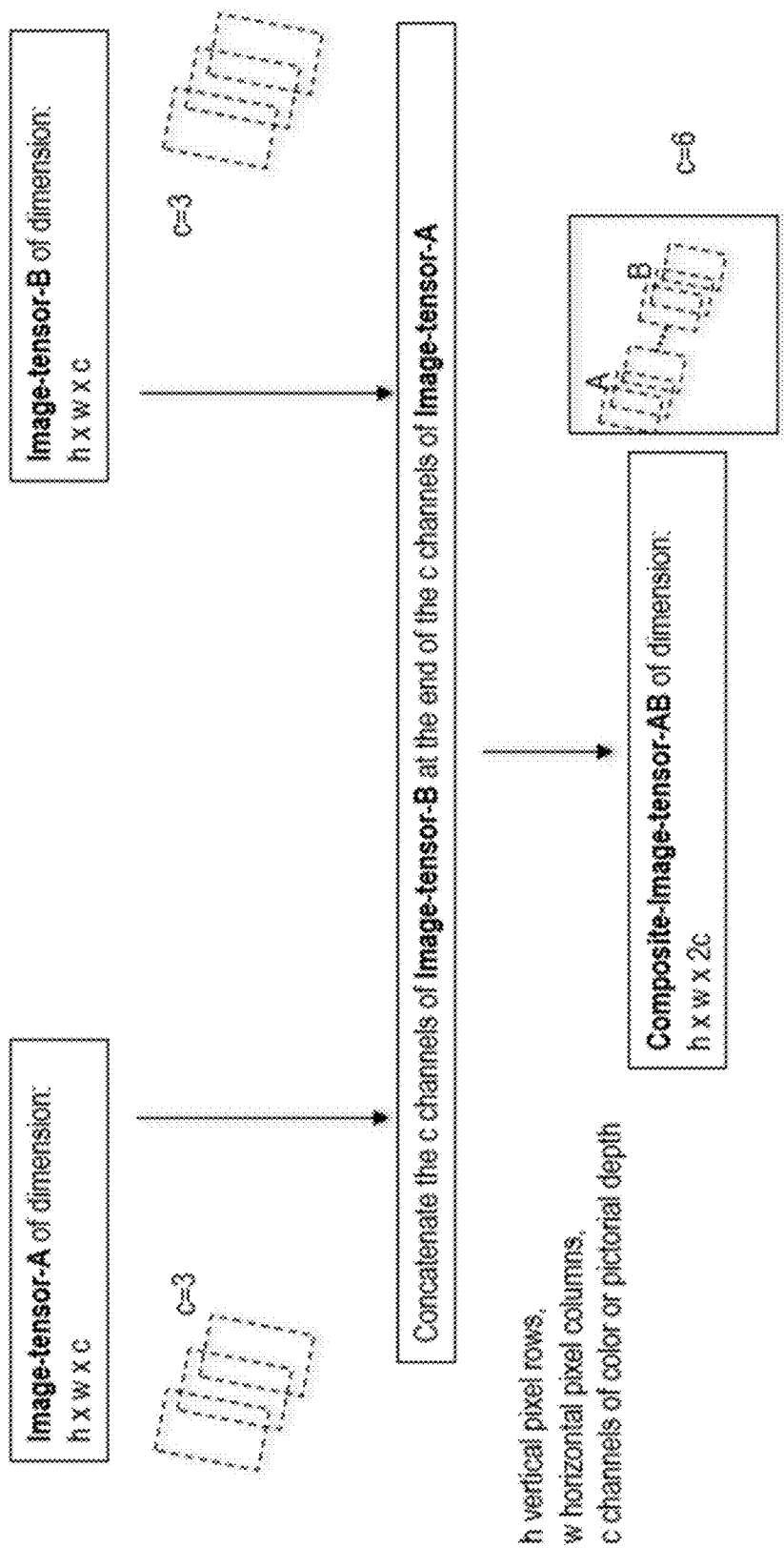
FIG. 9 illustrates the process of generating a composite image tensor from a pair of input images in alternate embodiments of the present disclosure.

The process for generating the composite image tensors will now be described with reference to FIG. 7. FIG. 7 is a flowchart illustrating the process for generating composite image tensors from the set of training gauge images in embodiments of the present disclosure. The method for generating the composite image tensors can be implemented in the tensor composer module 94 (FIG. 4) in some embodiments. FIG. 8 illustrates the process of generating a composite image tensor from a pair of input images in embodiments of the present disclosure. FIG. 9 illustrates the process of generating a composite image tensor from a pair of input images in alternate embodiments of the present disclosure. In the present description, an image tensor refers to a mathematical representation of an image. In particular, an image tensor can be a 2 or 3 dimensional array representation of the image. Furthermore, in the present description, a composite image tensor refers to two image tensors combined together. In some examples, the image tensors of two images are stacked together or concatenated to generate the composite the image tensor.

In embodiments of the present disclosure, the tensor composer module 94 (FIG. 4) generates the image tensors representing each input image in a pair. The tensor composer combines the image tensors into a single composite image tensor. The composite image tensor is the atomic entity provided to train the machine learning model.

Referring to FIGS. 7 and 8, a method 180 to generate the composite image tensors receives a pair of training images forming an ordered pair of training images (182). The method 180 then obtains an image tensor for each training image in the ordered pair (184). As shown in FIG. 8, an ordered pair of training images include an Image 1 and an Image 2. An image tensor for each image is generated. The method 180 then decomposes each image tensor into its constituent channel-matrices (186). For example, for a gauge image in color or an RGB gauge image, the channel-matrices include red, green and blue channel-matrices. For a grayscale gauge image, the channel-matrix contains intensity levels.

The method then performs image processing on some or all of the channel-matrices of each image tensor in the pair (188). For example, image processing may be performed on at least one channel-matrix of each image tensor in the pair. In some embodiments, the image processing steps include edge enhancement, sharpening or other image processing operations. The method 180 then concatenates the channel-matrices of the images onto one another to form a composite image tensor (190). For example, for color images, the red, green and blue matrices of the first image is followed by the red, green and blue matrices of the second image, as shown in FIG. 8. As a result, the method 180 generates the composite image tensor of the images in the ordered pair of training images (192). The method 180 then selects the next pair of training images (194). The method 180 is repeated for all pairs of training images over permutations of the training images (196). In some embodiment, the method 180 is repeated for all pairs of training images over all permutations of the training images. In particular, assume the training data set includes n training images, the number of pairs of images will be P(n,2), being the number of permutations of n images taken 2 at a time. As a result, composite image tensors are generated for all permutations of the training images.

FIG. 9 illustrates the process of generating a composite image tensor in more details in some embodiments. Referring to FIG. 9, an image tensor A for an image A and an image tensor B for an image B have been generated. In the present example, each image tensor A or B has a dimension of h by w by c, where h denotes the vertical pixel rows, w denotes the horizontal pixel columns and c denotes the channels of color or pictorial depth. In the present example, the images A and B are assumed to be RGB images and thus the number of channels is 3 for the three channels of color in the RGB image. The tensor composer module concatenates the c channels of image tensor B at the end of the c channels of image tensor A. As a result, a composite image tensor AB is formed having a dimension of h by w by 2c. In the present example, the composite image tensor AB has 6 channels (2c=6).

FIG. 10 illustrates the tensor composer labeling operation in some embodiments. Referring to FIG. 10, two training images Image A and Image B are being processed to be composed into composite image tensors. Image A has a gauge reading value that is less than the gauge reading value of Image B. For the permutation of Images A and B, the composite image tensor AB will be labeled as belonging to the first class as the indicator for Image A is to the left of the indicator of Image B. In another example, the composite image tensor AB will be labeled as belonging to the class Low as Image A has a lower gauge reading value than the gauge reading value of Image B. For the permutation of Images B and A, the composite image tensor BA will be labeled as belonging to the second class as the indicator for Image B is to the right of the indicator of Image A. In another example, the composite image tensor BA will be labeled as belonging to the class High as Image B has a higher gauge reading value than the gauge reading value of Image A. In some embodiments, the tensor composer generates labels for the composite image tensors generated for all permutations of the pairs of training images in the training data set. The data values or the ground truth value of the training images (such as A=2.2, B=3.5 as shown in the images in FIG. 10) is used to generate the class labels.

As described above, the trained machine learning model is provided to the comparator module 88 (FIG. 4) to be applied on operation gauge images, that is, gauge images collected during the course of the gauge operation, not during training of the machine learning model. In embodiments of the present disclosure, the comparator module 88 implements the operation of the tensor composer module 94 or the method to generate composite image tensors described above with reference to FIGS. 7-9 to generate a composite image tensor for each pair of an operation gauge image and the reference gauge image. In one embodiment, the comparator module 88 generates image tensors for the operation gauge image and the reference gauge image. The comparator module 88 decomposes each image tensor into constituent channel-matrices. The comparator module 88 may further perform image processing on some or all of the channel-matrices of each image tensor in the pair of images. For example, the comparator module 88 may perform image processing on at least one channel-matrix of each image tensor in the pair. The comparator module 88 then concatenates the channel-matrices of one image onto the channel matrices of the second image to form the composite image tensor. The composite image tensor thus formed is then provided to the machine learning model for classification, as described above.

In one example, the first image (Image 1) is the operation gauge image of the gauge being monitored and the second image (Image 2) is the reference gauge image indicating the threshold reading value of the gauge. The two image tensors are concatenated together as shown in FIG. 8 to form the composite image tensor including the image tensor of the operation gauge image stacked onto the image tensor of the reference gauge image.

Machine Learning Model

In embodiments of the present disclosure, the machine learning model implements the binary classification model. The binary classification model is applicable in the gauge monitoring comparator system of the present disclosure because the system is designed to discriminate one image tensor as having a value either less or more than the other image tensor. Binary classification can be achieved using either the neural-networks-approach, or a kernel based approach such as Support Vector Machine (which is inherently binary). In one embodiment, the machine learning model is implemented using two-dimensional convolutional neural networks. The neural-networks-approach entails stacking a series of 2-Dimensional (along pixel width and height) convolutional neural network-layers followed by at least one densely connected layer: typically Softmax classifier that estimates probabilities for two classes (hence binary). In other embodiments, the machine learning model is implemented using Support Vector Machine.

In one embodiment, the machine learning model implements the neural-networks-approach. In some embodiments, the neural network architecture implements a network with 3 convolutional neural network layers, each succeeded by a Maxpooling layer; followed by 1 flattening layer and dense layers. The flattening layer transforms the image manipulation from width×height×filters to 1×(width×height×filters). The network has 3 dense layers, with the last layer indicating two classes for binary classification.

Digitized Gauge Reading

Figure 11:
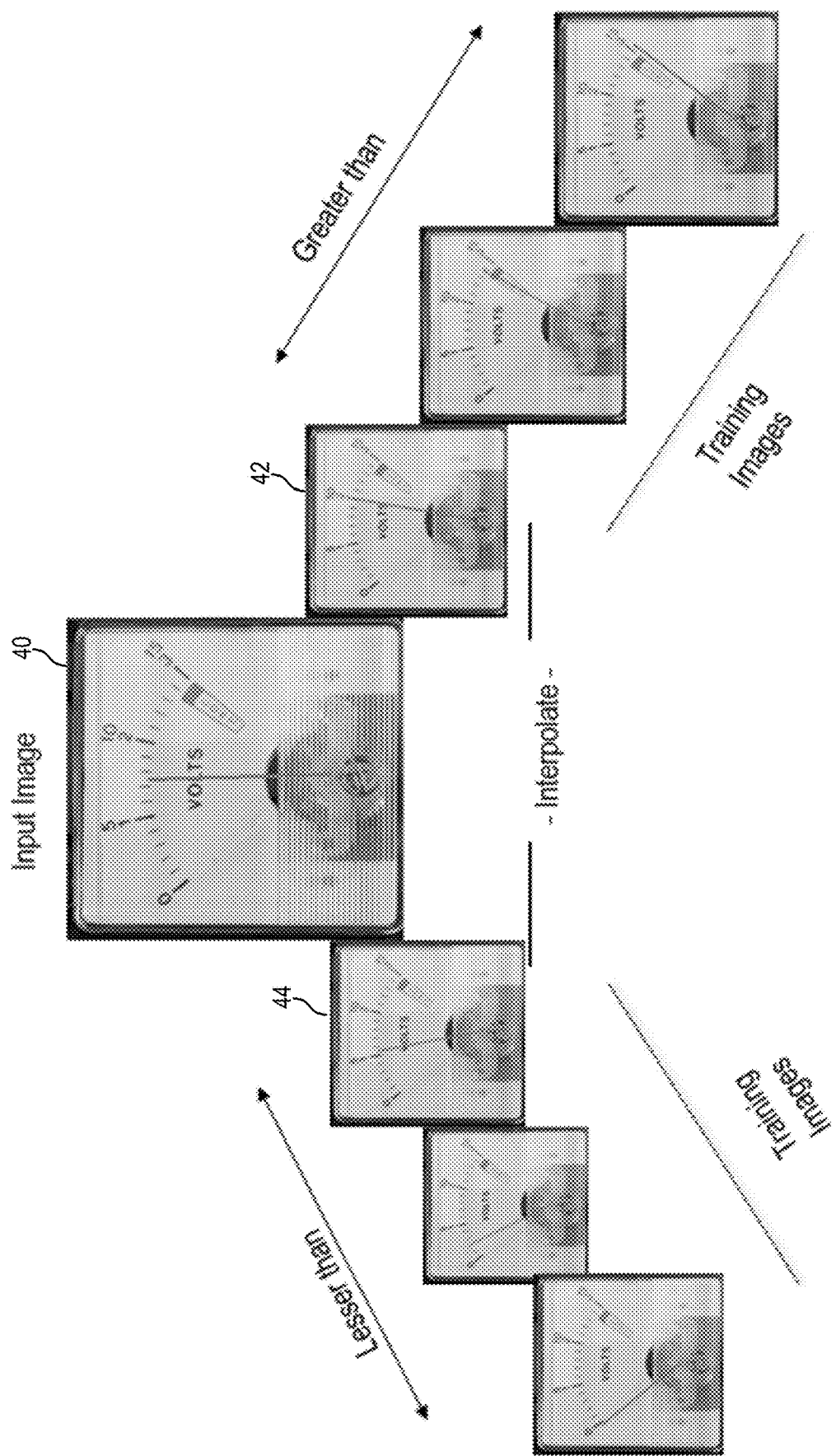
FIG. 11 illustrates the operation of the digitizer in embodiments of the present disclosure.
Figure 12:
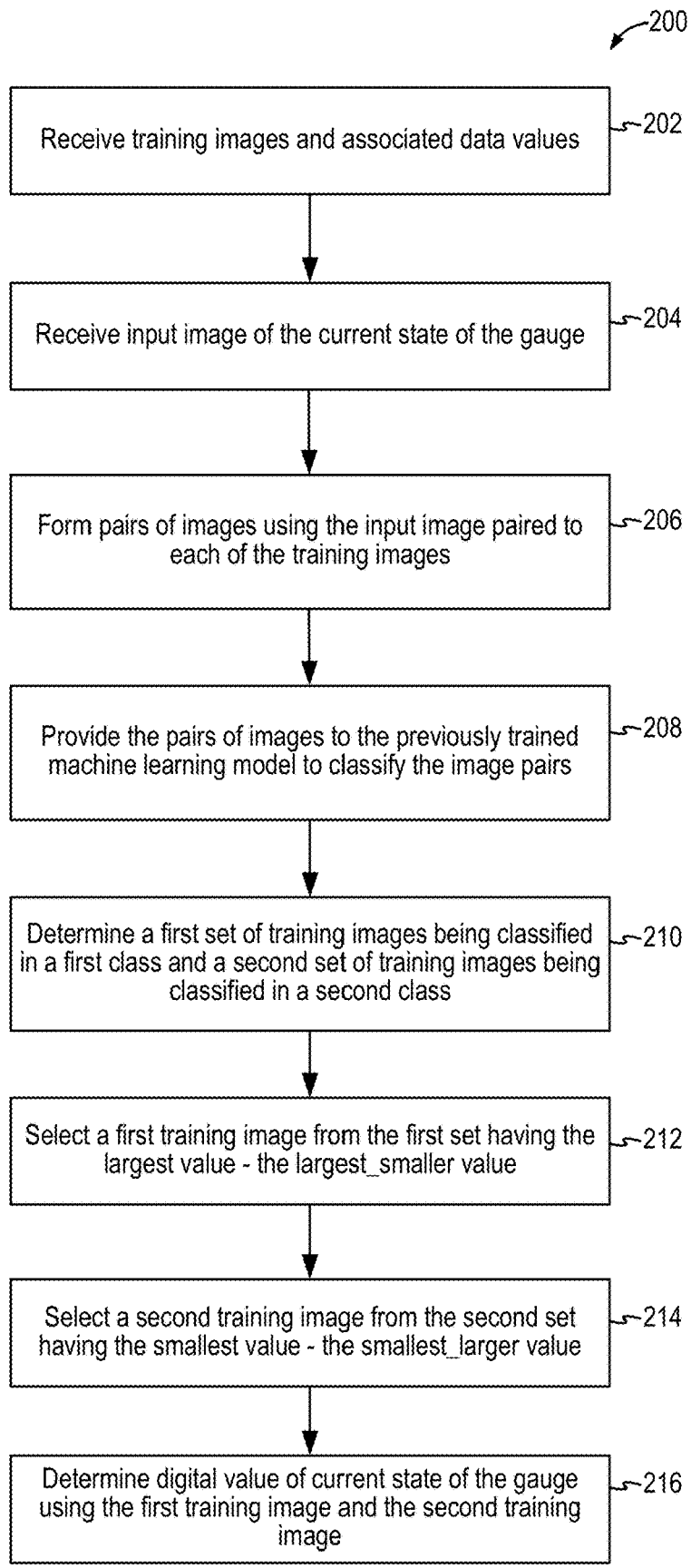
FIG. 12 is a flowchart illustrating a method for digitizing a gauge reading in embodiments of the present disclosure.

In alternate embodiments, the gauge monitoring comparator system and method of the present disclosure can be configured to operate as a digitizer to generate a reading value from an input gauge image. FIG. 11 illustrates the operation of the digitizer in embodiments of the present disclosure. FIG. 12 is a flowchart illustrating a method for digitizing a gauge reading in embodiments of the present disclosure. Referring to FIGS. 11 and 12, a method 200 for digitizing a gauge reading receives all of the training images in the training data set and the associated data values (202). The method 200 then receives an input image 40 (FIG. 11) of the current state of the gauge (204). The method 200 forms pairs of images using the input image paired to each of the training images (206). The method 200 then provides the pairs of images to the machine learning model previously trained to classify a pair of images into two classes (208). For example, the machine learning model may classify a pair of images as belonging to a first class when the indicator position of the first image is to the left of the indicator position of the second image. The machine learning model may classify a pair of images as belonging to a second class when the indicator position of the first image is to the right of the indicator position of the second image. In one example, the first class can be labeled as Low while the second class can be labeled as High.

The method 200 then determines a first set of training images being classified in the first class and a second set of training images being classified in the second class (210). The method 200 selects a first training image 44 (FIG. 11) from the first set having the largest value (212). The gauge reading for the first training image is denoted as the largest_smaller value as compared to the gauge reading of the input image. The method 200 further selects a second training image 42 (FIG. 11) from the second set having the smallest value (214). The gauge reading for the second training image is denoted as the smallest_larger value as compared to the gauge reading of the input image. The gauge reading values for the first training image and the second training image can be determined using the data values associated with the training images, that is the ground truth of the training images.

The method 200 determines the current state of the gauge using the gauge reading values of the first training image and the second training image (216). In some embodiments, the method 200 interpolates between the largest-smaller value (first training image 44) and the smallest-larger value (second training image 42) to generate a digital value for the current state. In one embodiment, the digital value of the current state of the gauge is given as the average of the largest-smaller value and the smallest-larger value. That is, digital value is equal to one-half the sum of the smallest-larger value and the largest-smaller value. In other embodiments, other interpolation methods of the gauge reading value can be used.

The invention can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A method for monitoring a gauge having a face including markings denoting a scale for a parameter value being measured by the gauge and an indicator indicating a reading of the parameter value over the scale by displacement of the indicator on the face, the method comprising:
  receiving an input indicative of a first reference gauge value;
  providing a first reference gauge image associated with the first reference gauge value to a machine learning model, wherein the machine learning model was previously trained based on a set of training data to classify relative indicator positions between any pair of gauge images;
  providing a first gauge image to the machine learning model;
  classifying, using the machine learning model, an indicator position on the first gauge image relative to an indicator position on the first reference gauge image;
  generating an output having a first value indicative of the indicator position of the first gauge image being on a first side of the indicator position of the first reference gauge image; and
  generating an output having a second value indicative of the indicator position of the first gauge image being on a second side of the indicator position of the first reference gauge image, the second side being opposite to the first side of the indicator position of the first reference gauge image.

2. The method of claim 1, further comprising:
  receiving an input indicative of a second reference gauge value;
  providing a second reference gauge image associated with the second reference gauge value to the machine learning model;
  providing a second gauge image to the machine learning model;
  classifying, using the machine learning model, an indicator position on the second gauge image relative to an indicator position on the second reference gauge image;
  generating an output having a first value indicative of the indicator position of the second gauge image being on a first side of the indicator position of the second reference gauge image; and
  generating an output having a second value indicative of the indicator position of the second gauge image being on a second side of the indicator position of the second reference gauge image, the second side being opposite to the first side of the indicator position of the second reference gauge image.

3. The method of claim 1, further comprising:
  receiving a set of training gauge images and data values associated with each training gauge image;
  for each permutation of a pair of the training gauge images, generating a composite image tensor of a first training gauge image and a second training gauge image in the pair;
  generating training labels for each composite image tensor, each training label having a first value indicative of a gauge indicator of the first training gauge image in the pair being on a first side of an indicator position of the second training gauge image in the pair and having a second value indicative of the gauge indicator of the first training gauge image in the pair being on a second side of the indicator position of the second training gauge image in the pair;
  training a binary classification model to predict probabilities of each composite image tensor being in a class associated with the first value and being in a class associated with the second value; and
  obtaining a trained machine learning model as a result of the training.

4. The method of claim 3, wherein generating the composite image tensor comprises:
  receiving an ordered pair of training gauge images including the first training gauge image and the second training gauge image;
  generating a first image tensor associated with the first training gauge image and a second image tensor associated with the second training gauge image;
  decomposing each of the first image tensor and the second image tensor into respective constituent channel matrices;
  performing image processing on at least one channel matrix of each image tensor; and
  concatenating the channel matrices of the first image tensor and the channel matrices of the second image tensor to generate the composite image tensor of the ordered pair of training gauge image including the first training gauge image and the second training gauge image.

5. The method of claim 1, wherein receiving the input indicative of the first reference gauge value comprises receiving the first reference gauge image as the input.

6. The method of claim 1, further comprising:
  receiving a set of training gauge images and data values associated with each training gauge image;
  receiving a first gauge image indicative of the gauge in operation;
  forming pairs of images using the first gauge image and each of the training gauge images in the set of training gauge images;
  providing the pairs of images to the machine learning model;
  determining a first set of training gauge images as having outputs of the first value;
  determining a second set of training gauge images as having outputs of the second value;
  selecting a first training gauge image having a largest data value from the first set of training gauge images;
  selecting a second training gauge image having a smallest data value from the second set of training gauge images; and
  obtaining a gauge reading value of the first gauge image using the selected first training gauge image and the selected second training gauge image.

7. The method of claim 6, wherein obtaining the gauge reading value of the first gauge image using the selected first training gauge image and the selected second training gauge image comprises:
  interpolating a data value of the selected first training gauge image and a data value of the selected second training gauge image to obtain the gauge reading value of the first gauge image.

8. A system for monitoring a gauge having a face including markings denoting a scale for a parameter value being measured by the gauge and an indicator indicating a reading of the parameter value over the scale by displacement of the indicator on the face, the system comprising:
  a hardware processor; and a memory coupled with the hardware processor, wherein the memory is configured to provide the hardware processor with instructions which, when executed, cause the hardware processor to:
- receive an input indicative of a first reference gauge value;
- provide a first reference gauge image associated with the first reference gauge value to a machine learning model, wherein the machine learning model was previously trained based on a set of training data to classify relative indicator positions between any pair of gauge images;
- provide a first gauge image to the machine learning model;
- classify, using the machine learning model, an indicator position on the first gauge image relative to an indicator position on the first reference gauge image;
- generate an output having a first value indicative of the indicator position of the first gauge image being on a first side of the indicator position of the first reference gauge image; and
- generate an output having a second value indicative of the indicator position of the first gauge image being on a second side of the indicator position of the first reference gauge image, the second side being opposite to the first side of the indicator position of the first reference gauge image.

9. The system of claim 8, wherein the memory is further configured to provide the hardware processor with instructions which when executed cause the hardware processor to:
- receive an input indicative of a second reference gauge value;
- provide a second reference gauge image associated with the second reference gauge value to the machine learning model;
- provide a second gauge image to the machine learning model;
- classify, using the machine learning model, an indicator position on the second gauge image relative to an indicator position on the second reference gauge image;
- generate an output having a first value indicative of the indicator position of the second gauge image being on a first side of the indicator position of the second reference gauge image; and
- generate an output having a second value indicative of the indicator position of the second gauge image being on a second side of the indicator position of the second reference gauge image, the second side being opposite to the first side of the indicator position of the second reference gauge image.

10. The system of claim 8, wherein the memory is further configured to provide the hardware processor with instructions which when executed cause the hardware processor to:
- receive a set of training gauge images and data values associated with each training gauge image;
- for each permutation of a pair of the training gauge images, generate a composite image tensor of a first training gauge image and a second training gauge image in the pair;
- generate training labels for each composite image tensor, each training label having a first value indicative of a gauge indicator of the first training gauge image in the pair being on a first side of an indicator position of the second training gauge image in the pair and having a second value indicative of the gauge indicator of the first training gauge image in the pair being on a second side of the indicator position of the second training gauge image in the pair;
- train a binary classification model to predict probabilities of each composite image tensor being in a class associated with the first value and being in a class associated with the second value; and
- obtain a trained machine learning model as a result of the training.

11. The system of claim 10, wherein the memory is further configured to provide the hardware processor with instructions which when executed cause the hardware processor to:
- receive an ordered pair of training gauge images including the first training gauge image and the second training gauge image;
- generate a first image tensor associated with the first training gauge image and a second image tensor associated with the second training gauge image;
- decompose each of the first image tensor and the second image tensor into respective constituent channel matrices;
- perform image processing on at least one channel matrix of each image tensor; and
- concatenate the channel matrices of the first image tensor and the channel matrices of the second image tensor to generate the composite image tensor of the ordered pair of training gauge images including the first training gauge image and the second training gauge image.

12. The system of claim 8, wherein the memory is further configured to provide the hardware processor with instructions which when executed cause the hardware processor to:
- receive the first reference gauge image as the input indicative of the first reference gauge value.

13. The system of claim 8, wherein the memory is further configured to provide the hardware processor with instructions which when executed cause the hardware processor to:
- receive a set of training gauge images and data values associated with each training gauge image;
- receive a first gauge image indicative of the gauge in operation;
- form pairs of images using the first gauge image and each of the training gauge images in the set of training gauge images;
- provide the pairs of images to the machine learning model;
- determine a first set of training gauge images as having outputs of the first value;
- determine a second set of training gauge images as having outputs of the second value;
- select a first training gauge image having a largest data value from the first set of training gauge images;
- select a second training gauge image having a smallest data value from the second set of training gauge images; and
- obtain a gauge reading value of the first gauge image using the selected first training gauge image and the selected second training gauge image.

14. The system of claim 13, wherein the memory is further configured to provide the hardware processor with instructions which when executed cause the hardware processor to:
- interpolate a data value of the selected first training gauge image and a data value of the selected second training gauge image to obtain the gauge reading value of the first gauge image.

15. A non-transitory computer readable medium storing instructions which, when executed by a computer, cause the computer to:
    receive an input indicative of a first reference gauge value;
    provide a first reference gauge image associated with the first reference gauge value to a machine learning model, wherein the machine learning model was previously trained based on a set of training data to classify relative indicator positions between any pair of gauge images;
    provide a first gauge image to the machine learning model;
    classify, using the machine learning model, an indicator position on the first gauge image relative to an indicator position on the first reference gauge image;
    generate an output having a first value indicative of the indicator position of the first gauge image being on a first side of the indicator position of the first reference gauge image; and
    generate an output having a second value indicative of the indicator position of the first gauge image being on a second side of the indicator position of the first reference gauge image, the second side being opposite to the first side of the indicator position of the first reference gauge image.

16. The non-transitory computer readable medium of claim 15, wherein the instructions further cause the computer to:
    receive an input indicative of a second reference gauge value;
    provide a second reference gauge image associated with the second reference gauge value to the machine learning model;
    provide a second gauge image to the machine learning model;
    classify, using the machine learning model, an indicator position on the second gauge image relative to an indicator position on the second reference gauge image;
    generate an output having a first value indicative of the indicator position of the second gauge image being on a first side of the indicator position of the second reference gauge image; and
    generate an output having a second value indicative of the indicator position of the second gauge image being on a second side of the indicator position of the second reference gauge image, the second side being opposite to the first side of the indicator position of the second reference gauge image.

17. The non-transitory computer readable medium of claim 15, wherein the instructions further cause the computer to:
    receive a set of training gauge images and data values associated with each training gauge image;
    for each permutation of a pair of the training gauge images, generate a composite image tensor of a first training gauge image and a second training gauge image in the pair;
    generate training labels for each composite image tensor, each training label having a first value indicative of a gauge indicator of the first training gauge image in the pair being on a first side of an indicator position of the second training gauge image in the pair and having a second value indicative of the gauge indicator of the first training gauge image in the pair being on a second side of the indicator position of the second training gauge image in the pair;
    train a binary classification model to predict probabilities of each composite image tensor being in a class associated with the first value and being in a class associated with the second value; and
    obtain a trained machine learning model as a result of the training.

18. The non-transitory computer readable medium of claim 17, wherein the instructions further cause the computer to:
    receive an ordered pair of training gauge images including the first training gauge image and the second training gauge image;
    generate a first image tensor associated with the first training gauge image and a second image tensor associated with the second training gauge image;
    decompose each of the first image tensor and the second image tensor into respective constituent channel matrices;
    perform image processing on at least one channel matrix of each image tensor; and
    concatenate the channel matrices of the first image tensor and the channel matrices of the second image tensor to generate the composite image tensor of the ordered pair of the first training gauge image and the second training gauge image.

19. The non-transitory computer readable medium of claim 15, wherein the instructions further cause the computer to:
    receive the first reference gauge image as the input indicative of the first reference gauge value.

20. The non-transitory computer readable medium of claim 15, wherein the instructions further cause the computer to:
    receive a set of training gauge images and data values associated with each training gauge image;
    receive a first gauge image indicative of a gauge in operation;
    form pairs of images using the first gauge image and each of the training gauge images in the set of training gauge images;
    provide the pairs of images to the machine learning model;
    determine a first set of training gauge images as having outputs of the first value;
    determine a second set of training gauge images as having outputs of the second value;
    select a first training gauge image having a largest data value from the first set of training gauge images;
    select a second training gauge image having a smallest data value from the second set of training gauge images; and
    obtain a gauge reading value of the first gauge image using the selected first training gauge image and the selected second training gauge image.

\* \* \* \* \*